United States Patent
Kim

(10) Patent No.: US 10,214,234 B2
(45) Date of Patent: Feb. 26, 2019

(54) STEERING RETURN CONTROL APPARATUS AND METHOD OF MOTOR DRIVEN POWER STEERING

(71) Applicant: HYUNDAI MOBIS CO., LTD., Seoul (KR)

(72) Inventor: Tae Hong Kim, Seongnam-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 15/859,168

(22) Filed: Dec. 29, 2017

(65) Prior Publication Data
US 2018/0186399 A1 Jul. 5, 2018

(30) Foreign Application Priority Data

Jan. 2, 2017 (KR) .................. 10-2017-0000474

(51) Int. Cl.
*B62D 5/04* (2006.01)
*B62D 6/02* (2006.01)
*B62D 7/15* (2006.01)
*B62D 6/00* (2006.01)

(52) U.S. Cl.
CPC ......... *B62D 5/0466* (2013.01); *B62D 5/0463* (2013.01); *B62D 6/02* (2013.01); *B62D 7/159* (2013.01); *B62D 5/0493* (2013.01); *B62D 6/005* (2013.01)

(58) Field of Classification Search
None
See application file for complete search history.

(56) References Cited

U.S. PATENT DOCUMENTS

| | | | | |
|---|---|---|---|---|
| 8,230,667 B2 * | 7/2012 | Finkler | ................ | A01D 41/127 56/10.2 A |
| 8,494,733 B2 * | 7/2013 | Kodaka | ................. | B60W 10/06 180/305 |
| 2007/0205037 A1 * | 9/2007 | Miyajima | ............ | B62D 5/0463 180/422 |
| 2008/0142293 A1 * | 6/2008 | Goto | ...................... | B62D 6/003 180/446 |
| 2016/0280254 A1 * | 9/2016 | Shimizu | ................... | B62D 5/04 |
| 2017/0158227 A1 * | 6/2017 | Katzourakis | ........... | B62D 6/008 |

FOREIGN PATENT DOCUMENTS

| | | |
|---|---|---|
| KR | 10-2010-0114995 A | 10/2010 |
| KR | 10-2015-0142123 A | 12/2015 |

* cited by examiner

*Primary Examiner* — Thomas G Black
*Assistant Examiner* — Demetra R Smith-Stewart
(74) *Attorney, Agent, or Firm* — Knobbe Martens Olson & Bear LLP

(57) ABSTRACT

A steering return control apparatus of an MDPS may include: a vehicle speed sensor configured to detect a vehicle speed; a yaw rate sensor configured to sense a tilted state of the vehicle, and output a yaw rate value; a column torque sensor configured to detect a column torque applied to a steering shaft; a motor encoder configured to detect a rotation amount of a motor; and a return controller configured to receive the vehicle speed, the yaw rate value and the column torque, determine whether the vehicle is driven in a neutral state, calculate a rack position and rack speed from the rotation amount of the motor, set a target position value in the neutral drive state, calculate a return torque for returning a steering wheel to the target position value, adjust a gain according to the vehicle speed and column torque, and output a return torque driving value.

9 Claims, 4 Drawing Sheets

STEERING RETURN CONTROL APPARATUS AND METHOD OF MOTOR DRIVEN POWER STEERING

CROSS-REFERENCES TO RELATED APPLICATIONS

The present application claims priority to Korean application number 10-2017-0000474, filed on Jan. 2, 2017, which is incorporated by reference in its entirety.

BACKGROUND OF THE INVENTION

The present invention relates to a steering return control apparatus and method of an MDPS (Motor Driven Power Steering), and more particularly, to a steering return control apparatus and method of an MDPS, which can correct a target position value for return control by monitoring a neutral drive state of a vehicle in real time, and return a steering wheel to a position at which the vehicle can be driven in the neutral state, even though wheel alignment is distorted or an error occurs in a steering angle sensor, thereby preventing a degradation of return control performance.

In general, a motor driven power steering (MDPS) refers to a system that provides an assist torque in a steering direction of a driver, using an electric motor, and thus enables the driver to easily handle a steering wheel.

Unlike an existing hydraulic power steering (HPS), the MDPS can automatically control an operation of the electric motor depending on a driving condition of a vehicle, and thus improve steering performance and steering feel.

At this time, the MDPS includes a torque sensor and a vehicle speed sensor, in order to determine the driving condition of the vehicle. The torque sensor measures a steering torque of the driver, inputted to the steering wheel, and the vehicle speed sensor measures a vehicle speed.

The driver applies a steering input to turn the vehicle, and then releases the steering wheel when determining that the vehicle was turned to a desired extent. However, the steering wheel is returned to the center through a returning operation.

The returning operation of the steering wheel is performed through a self alignment torque of a tire. Typically, when the vehicle is being turned at a velocity of 5 km/h to 30 km/h, the returning operation can be usefully used.

However, the self alignment torque applied to the steering wheel is not enough to return the steering wheel to the center because a residual steering angle remains due to a frictional force of the steering system.

Thus, a function of assisting the returning operation is inevitably provided in order to completely return the steering wheel to the center.

Therefore, the MDPS applies a return torque which is calculated based on the steering wheel, and assists the returning operation of the steering wheel, thereby improving the returning performance.

The related art is disclosed in Korean Publication Patent No. 2010-0114995 published on Oct. 27, 2010 and entitled "Steering return method of MDPS".

When the MDPS calculates the return torque based on the steering angle and returns the steering wheel, wheel alignment may be distorted by the load of the vehicle or a road condition and left and right friction charge of a mechanical part, an error may occur in the initial zero adjustment of a steering angle sensor, or a hysteresis and offset of the steering angle sensor may occur. In this case, the return control may not be optimized.

SUMMARY OF THE INVENTION

Embodiments of the present invention are directed to a steering return control apparatus and method of an MDPS, which can correct a target position value for return control by monitoring a neutral drive state of a vehicle in real time, and return a steering wheel to a position at which the vehicle can be driven in the neutral state, even though wheel alignment is distorted or an error occurs in a steering angle sensor, thereby preventing a degradation of return control performance.

In one embodiment, a steering return control apparatus of an MDPS may include: a vehicle speed sensor configured to detect a vehicle speed; a yaw rate sensor configured to sense a tilted state of the vehicle, and output a yaw rate value; a column torque sensor configured to detect a column torque applied to a steering shaft; a motor encoder configured to detect a rotation amount of a motor that drives a rack bar; and a return controller configured to receive the vehicle speed, the yaw rate value and the column torque from the vehicle speed sensor, the yaw rate sensor and the column torque sensor, respectively, determine whether the vehicle is driven in a neutral state, calculate a rack position and rack speed from the rotation amount of the motor, inputted from the motor encoder, set a target position value in the neutral drive state, calculate a return torque for returning a steering wheel to the target position value, adjust a gain according to the vehicle speed and the column torque, and output a return torque driving value.

The return controller may include: a neutral drive determination unit configured to receive the vehicle speed, the yaw rate value and the column torque from the vehicle speed sensor, the yaw rate sensor and the column torque sensor, respectively, and determine whether the vehicle is driven in the neutral state; a return torque calculator configured to set the target position value to the rack position calculated from the rotation amount of the motor, inputted from the motor encoder, depending on the neutral drive state determined by the neutral drive determination unit, calculate a return amount based on a position difference between the target position value and a current rack position, calculate a return speed for driving the return amount according to the rack speed, and calculate the return torque; and a return torque outputter configured to apply a gain to the return torque calculated by the return torque calculator depending on the vehicle speed and the column torque, and output the return torque driving value.

The return torque calculator may include: a rack position calculator configured to calculate the rack position from the rotation amount of the motor, inputted from the motor encoder; a rack speed calculator configured to calculate the rack speed from the rotation amount of the motor, inputted from the motor encoder; a return amount calculator configured to calculate the return amount based on the position difference between the target position value and the rack position; and a return speed calculator configured to calculate the return speed for driving the return amount calculated by the return amount calculator according to the rack speed.

The return torque outputter may apply a vehicle speed gain and a decoupling gain to the return torque, and output the return torque driving value, wherein the vehicle speed gain is outputted as a gain of 1 when the vehicle speed is within a preset speed range, and the decoupling gain decreases from the gain of 1 as the column torque is increased.

When the vehicle speed exceeds a reference vehicle speed, the column torque is less than a reference column torque for each vehicle speed, the yaw rate values is less than a reference yaw rate value, and an accumulated neutral state retention time exceeds a neutral state determination reference time, the neutral drive determination unit may determine that the vehicle is driven in the neutral state.

The steering return control apparatus may further include a storage configured to store the target position value in the neutral drive state, which is set by the return controller.

In another embodiment, a steering return control method of an MDPS may include: receiving, by a return controller, a vehicle speed, a yaw rate value and a column torque from a vehicle speed sensor, a yaw rate sensor and a column torque sensor, respectively, and determining whether a vehicle is driven in a neutral state; setting, by the return controller, a current rack position to a target position value when it is determined that the vehicle is driven in the neutral state; calculating, by the return controller, a return torque for returning a steering wheel to the target position value according to the rack position and rack speed; and applying, by the return controller, a gain based on the vehicle speed and column torque to the calculated return torque, and outputting a return torque driving value.

The determining of whether the vehicle is driven in the neutral state may include: determining, by the return controller, whether the vehicle speed exceeds a reference vehicle speed; determining, by the return controller, whether the column torque is less than a reference column torque for each vehicle speed, when the vehicle speed exceeds the reference vehicle speed; determining, by the return controller, whether the yaw rate value is less than a reference yaw rate value, when the column torque is less than the reference column torque for each vehicle speed; accumulating, by the return controller, a drive state retention time when the yaw rate value is less than a reference yaw rate value; and determining, by the return controller, that the vehicle is driven in the neutral state, when the drive state retention time exceeds a neutral state determination reference time.

The setting of the current rack position to the target position value may include storing, by the return controller, the target position value in a storage.

The calculating of the return torque may include calculating, by the return controller, the rack position and the rack speed from a rotation amount of a motor, inputted from a motor encoder.

The calculating of the return torque may include: calculating, by the return controller, a return amount based on a position difference between the target position value and the current rack position; calculating, by the return controller, a return speed for driving the return amount according to the rack speed; and calculating, by the return controller, the return torque according to the calculated return speed.

In the outputting of the return torque driving value, the return torque outputter may apply a vehicle speed gain and a decoupling gain to the return torque, and output the return torque driving value, wherein the vehicle speed gain is outputted as a gain of 1 when the vehicle speed is within a preset speed range, and the decoupling gain decreases from the gain of 1 as the column torque is increased.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
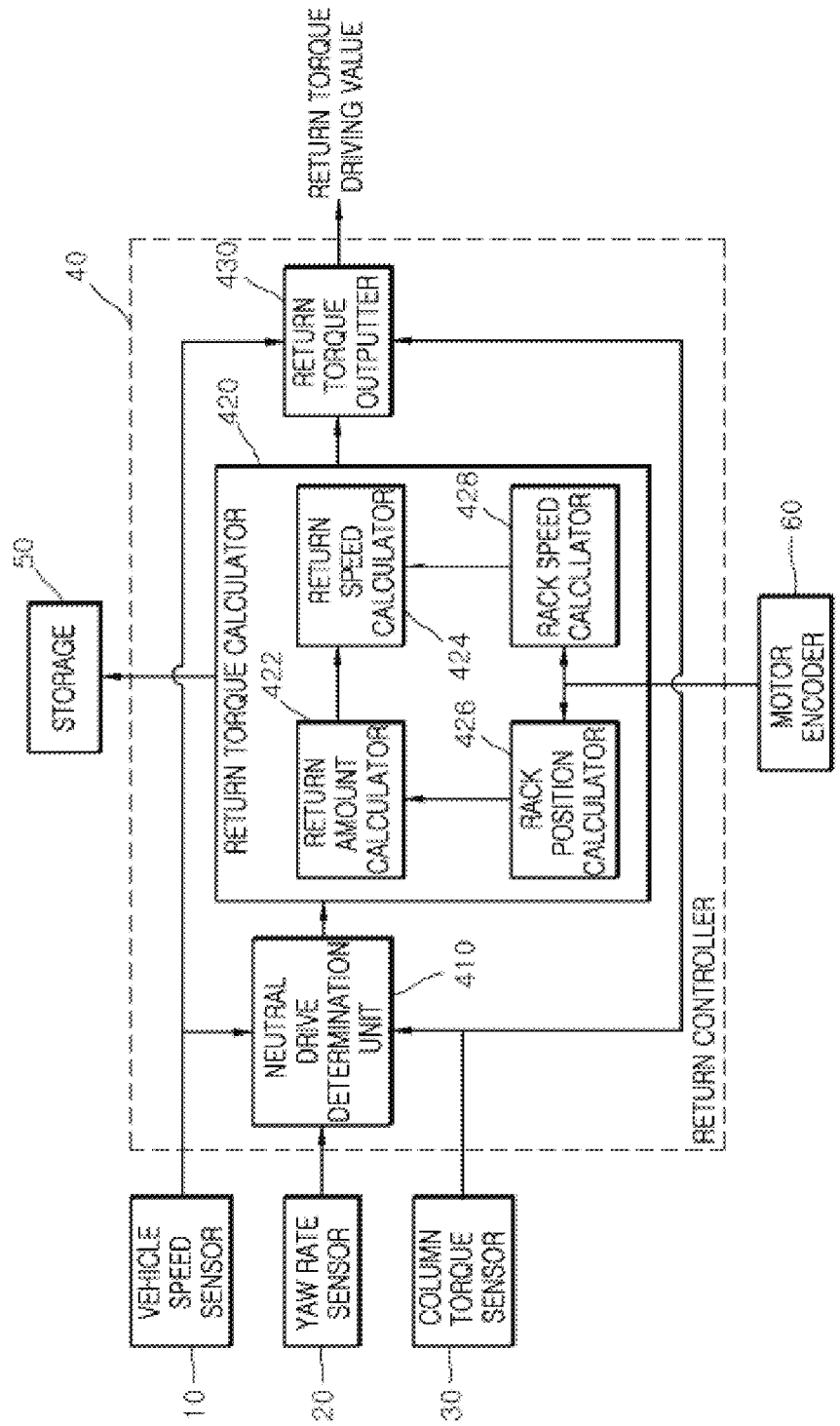
FIG. 1 is a block configuration diagram illustrating a steering return control apparatus of a motor driven power steering (MDPS) in accordance with an embodiment of the present invention.
Figure 2:
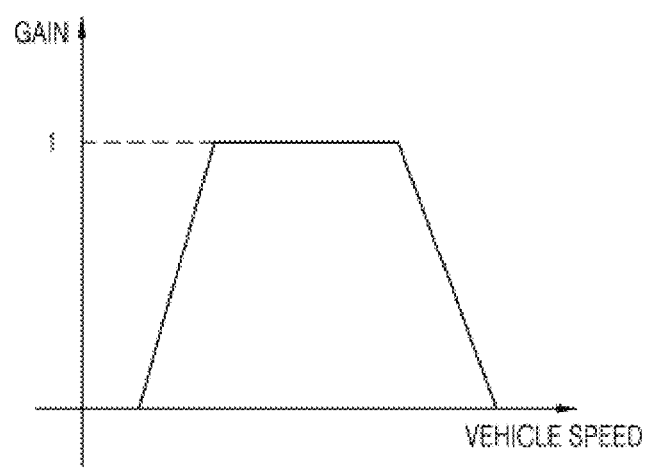
FIG. 2 is a graph illustrating a vehicle speed gain based on a vehicle speed in the steering return control apparatus of the MDPS in accordance with the embodiment of the present invention.
Figure 3:
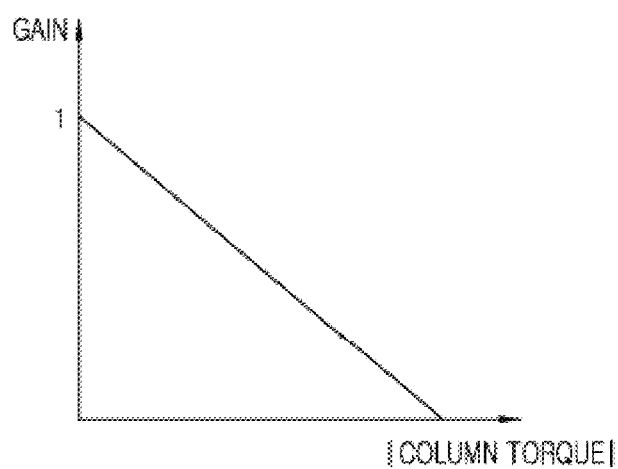
FIG. 3 is a graph illustrating a decoupling gain based on a column torque in the steering return control apparatus of the MDPS in accordance with the embodiment of the present invention.

FIG. 1 is a block configuration diagram illustrating a steering return control apparatus of a motor driven power steering (MDPS) in accordance with an embodiment of the present invention, FIG. 2 is a graph illustrating a vehicle speed gain based on a vehicle speed in the steering return control apparatus for an MDPS in accordance with the embodiment of the present invention, and FIG. 3 is a graph illustrating a decoupling gain based on a column torque in the steering return control apparatus of the MDPS in accordance with the embodiment of the present invention.

As illustrated in FIG. 1, the steering return control apparatus of the MDPS in accordance with the embodiment of the present invention may include a vehicle speed sensor 10, a yaw rate sensor 20, a column torque sensor 30, a motor encoder 60, a return controller 40 and a storage 50.

In the present embodiment, the MDPS system may be applied to a column MDPS (C-MDPS) in which a motor (not illustrated) is coupled to a steering shaft (not illustrated), a pinion MDPS (P-MDPS) in which a motor is coupled to a pinion gear of a steering shaft (not illustrated), and a rack DMPS (R-MDPS) in which a motor is coupled to a rack gear (not illustrated). In the present embodiment, the R-MDPS will be taken as an example for description.

The R-MDPS may receive a driving torque from the motor and move a rack bar (not illustrated) in the axial direction. The R-MDPS may convert a rotational force of the motor into a linear driving force in the axial direction of the rack bar. For this operation, the R-MDPS may include a belt, pulley, ball nut, bearing, ball screw-type rack and the like. That is, the ball nut in a reducer may be coupled to the rack bar while being rotatably supported by the bearing, a driving pulley may be fixed to a driving shaft of the motor such that a driven pulley transfers a rotational force to the ball nut coupled to the rack bar, and the driving pulley at the motor and the driven pulley at the ball nut may be connected through the belt so as to transfer the rotational force of the motor to the rack bar through the pulley and belt. At this time, the rotational force of the motor may be converted into the linear driving force of the rack bar by the ball screw structure of the ball nut and the rack bar.

The vehicle speed sensor 10 may sense a vehicle speed, and outputs the sensed vehicle speed to the return controller 40.

The yaw rate sensor 20 may sense a titled state of the vehicle, and output a yaw rate value to the return controller 40.

The column torque sensor 30 may sense a column torque applied to the steering shaft (not illustrated), and output the sensed column torque to the return controller 40.

The motor encoder 60 may detect a rotation amount of the motor for driving the rack bar, and output the detected rotation amount to the return controller 40. The return controller 40 may calculate a rack position and rack speed in order to calculate a return amount and return speed.

The return controller 40 may receive the vehicle speed, the yaw rate value and the column torque from the vehicle speed sensor 10, the yaw rate sensor 20 and the column torque sensor 30, respectively, and determine whether the vehicle is driven in a neutral state (hereafter, referred to as a neutral drive state). Then, the return controller 40 may calculate a rack position and rack speed from the rotation amount of the motor, inputted from the motor encoder 60, set a target position value in the neutral drive state, calculate a return torque for returning the steering wheel to the target position value, adjust a gain value according to the vehicle speed and column torque, and output a return torque driving value.

For this operation, the return controller 40 may include a neutral drive determination unit 410, a return torque calculator 420 and a return torque outputter 430.

The neutral drive determination unit 410 may receive the vehicle speed, the yaw rate value and the column torque from the vehicle speed sensor 10, the yaw rate sensor 20 and the column torque sensor 30, respectively, and determine whether the vehicle is driven in the neutral state.

The neutral drive determination unit 410 may determine that the vehicle is driven in the neutral state, when the vehicle speed exceeds a reference vehicle speed, the column torque is less than a reference column torque for each vehicle speed, the yaw rate value is a reference yaw rate value, and an accumulated neutral state retention time exceeds the neutral state determination reference time.

More specifically, when the vehicle is being driven while the vehicle speed thereof exceeds the reference vehicle speed after startup, the column torque is less than the reference column torque for each vehicle speed, the yaw rate value is less than the reference yaw rate value, and the accumulated drive state retention time exceeds the neutral state determination reference time, the neutral drive determination unit 410 may determine that the vehicle is driven in the neutral state. At this time, when the column torque is less than the reference column torque for each vehicle speed, the neutral state can be maintained according to the self alignment of the vehicle even though a column torque is applied, because the column torque is smaller than the self alignment amount of the vehicle.

Therefore, the return controller 40 may set a rack position to a target position value for returning the steering wheel to the neutral position, the rack position corresponding to a rack position when it is determined that the vehicle is driven in the neutral state, and store the rack position in the storage 50.

As such, the steering return control apparatus may determine whether the vehicle is driven in the neutral state, based on the actual drive state of the vehicle, and return the steering wheel to the neutral position at which the vehicle can be driven in the neutral state, even though the wheel alignment of the vehicle is distorted by the load of the vehicle or the road condition and the left and right friction charge of a mechanical part, an error occurs in the initial zero point adjustment of the steering angle sensor, or a hysteresis and offset of a sensor occurs.

The return torque calculator 420 may set the target position value to the rack position calculated from the rotation amount of the motor, inputted from the motor encoder 60, according to the neutral drive state determined by the neutral drive determination unit 410, and store the target position value in the storage 50. Furthermore, the return torque calculator 420 may calculate a return amount based on a position difference between the target position value and the current rack position, and calculate a return speed for driving the return amount according to the rack speed, in order to calculate a return torque.

For this operation, the return torque calculator 420 may include a rack position calculator 426, a rack speed calculator 428, a return amount calculator 422 and a return speed calculator 424.

The rack position calculator 426 may calculate a rack position from the rotation amount of the motor, inputted from the motor encoder 60, and the rack speed calculator 428 may calculate a rack speed from the rotation amount of the motor, inputted from the motor encoder 60. The return amount calculator 422 may calculate a return amount based on a position difference between the target position value and the current rack position, and the return speed calculator 424 may calculate a return speed for driving the return amount calculated by the return amount calculator 422, according to the rack speed.

Therefore, the return torque calculator 420 may create an error value by comparing the current rack position and the target position value, and calculate a rack position for return. The return torque calculator 420 may calculate a rack speed during return by adjusting a limit value, position or speed PI gain through a difference between the current rack speed and the target speed, and adjust a return steering feel smoothly.

The return torque outputter 430 may apply a gain to the return torque calculated by the return torque calculator 420, depending on the vehicle speed and the column torque, and output the return torque driving value.

As illustrated in FIG. 2, the return torque outputter 430 may apply a vehicle speed gain to the calculated return torque, and output the return torque driving value. For example, the return torque outputter 430 may apply a gain '1' when the vehicle speed is within a preset speed range. That is, when the vehicle speed is '0', return control does not need to be performed. Thus, the return torque outputter 430 may apply a gain as '0'. However, when the vehicle speed is within the preset speed range, the return torque outputter 430 may apply a gain as '1', in order to perform return control. Furthermore, during a high-speed period where the vehicle speed exceeds the preset speed range, the return torque outputter 430 may reduce a return gain to prevent excessive return control, in consideration of the self alignment characteristic of the vehicle.

As illustrated in FIG. 3, the return torque outputter 430 may apply a decoupling gain to the calculated return torque. When the return torque is equal to or more than a preset torque, the return torque outputter 430 may determine that a driver has an intention to handle the steering wheel, and decrease the return gain in order to reduce a strange feel caused by the return control. When the return torque is less than the preset torque, the return torque outputter 430 may determine that the driver has no intention to handle the steering wheel, and increase the return gain.

The storage 50 may store the target position value in the neutral drive state set by the return controller 40, such that the target position value can be retained even though the engine is turned on/off. Thus, the target position value can be directly applied until the return controller 40 determines the neutral drive state of the vehicle and updates the target position value, which makes it possible to raise the return stability.

As described above, the steering return control apparatus of the MDPS in accordance with the embodiment of the present invention may correct the target position value of the rack stroke for return control by monitoring the neutral drive state of the vehicle in real time, and return the steering wheel to the neutral position at which the vehicle can be driven in the neutral state even though the wheel alignment is distorted or an error occurs in the steering angle sensor. Thus, the steering return control apparatus can prevent a degradation of the return control performance, and improve steering convenience for a driver.

Figure 4:
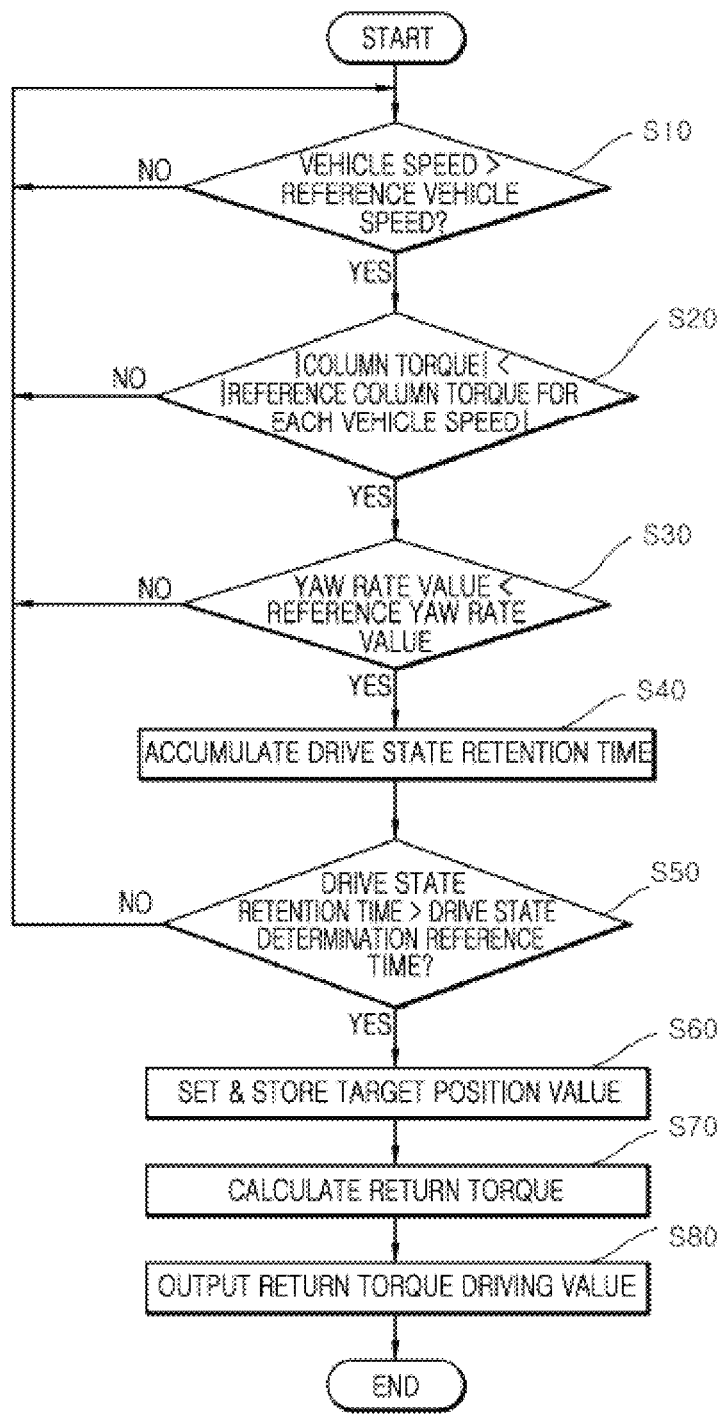
FIG. 4 is a flowchart illustrating a steering return control method of an MDPS in accordance with an embodiment of the present invention.

FIG. 4 is a flowchart illustrating a steering return control method of an MDPS in accordance with an embodiment of the present invention.

As illustrated in FIG. 4, the steering return control method of the MDPS in accordance with the embodiment of the present invention may start with a process in which the return controller 40 receives a vehicle speed, a yaw rate value and a column torque from the vehicle speed sensor 10, the yaw rate sensor 20 and the column torque sensor 30, respectively, and determines whether the vehicle is driven in a neutral state.

Specifically, the return controller 40 may determine whether the vehicle speed inputted from the vehicle speed sensor 10 exceeds a reference vehicle speed, at step S10.

When it is determined at step S10 that the vehicle speed does not exceed the reference vehicle speed, the procedure may return to step S10. On the other hand, when it is determined at step S10 that the vehicle speed exceeds the reference vehicle speed, the return controller 40 may determine whether the absolute value of the column torque inputted from the column torque sensor 30 is less than a reference column torque for each vehicle speed, at step S20.

When it is determined at step S20 that the column torque is not less than the reference column torque for each vehicle speed, the procedure may return to step S10. On the other hand, when it is determined at step S20 that the column torque is less than the reference column torque for each vehicle speed, the return controller 40 may determine whether the yaw rate value inputted from the yaw rate sensor 20 is less than a reference yaw rate value, at step S30.

When it is determined at step S30 that the yaw rate value is not less than the reference yaw rate value, the procedure may return to step S10. On the other hand, when it is determined at step S30 that the yaw rate value is less than the reference yaw rate value, the return controller 40 may accumulate a drive state retention time at step S40.

After accumulating the drive state retention time at step S40, the return controller 40 may determine whether the drive state retention time exceeds a neutral state determination reference time, at step S50.

When it is determined at step S50 that the drive state retention time does not exceed the neutral state determination reference time, the return controller 40 may return to step S10 in order to repeat the process for determining whether the vehicle is driven in the neutral state.

On the other hand, when it is determined at step S50 that the neutral state retention time exceeds the neutral state determination reference time, the return controller 40 may determine that the vehicle is driven in the neutral state, calculate a current rack position based on a rotation amount of the motor, inputted from the motor encoder 60, set the current rack position to a target position value, and store the target position value in the storage 50, at step S60.

As such, when the vehicle is being driven while the vehicle speed thereof exceeds the reference vehicle speed after startup, the column torque is less than the reference column torque for each vehicle speed, the yaw rate value is less than the reference yaw rate value, and the accumulated drive state retention time exceeds the neutral state determination reference time, the return controller 40 may determine that the vehicle is driven in the neutral state. At this time, when the column torque is less than the reference column torque for each vehicle speed, the neutral state can be maintained according to the self alignment of the vehicle even though a column torque is applied, because the column torque is smaller than the self alignment amount of the vehicle.

After setting and storing the target position value at step S60, the return controller 40 may calculate a return torque for returning the steering wheel to the neutral state, based on a rack position and rack speed which are inputted during driving, at step S70.

In order to calculate the return torque, the return controller 40 may calculate the rack position and rack speed from the rotation amount of the motor, inputted from the motor encoder 60, and calculate a return amount based on a position difference between the target position value and the current rack position. Then, the return controller 40 may calculate a return speed for driving the calculated return amount according to the rack speed, and calculate the return torque based on the calculated return speed.

After calculating the return torque at step S70, the return controller 40 may apply a gain based on the vehicle speed and column torque to the calculated return torque, and output a return torque driving value, at step S80.

As illustrated in FIG. 2, the return controller 40 may apply a vehicle speed gain to the calculated return torque, and output the return torque driving value. For example, the return controller 40 may apply a gain '1' when the vehicle speed is within a preset speed range. That is, when the vehicle speed is '0', return control does not need to be performed. Thus, the return controller 40 may apply a gain as '0'. However, when the vehicle speed is within the preset speed range, the return controller 40 may apply a gain as '1', in order to perform return control. Furthermore, during a high-speed period where the vehicle speed exceeds the preset speed range, the return controller 40 may reduce a return gain to prevent excessive return control, in consideration of the self alignment characteristic of the vehicle.

As illustrated in FIG. 3, the return controller 40 may apply a decoupling gain to the calculated return torque. When the return torque is equal to or more than a preset torque, the return controller 40 may determine that a driver has an intention to handle the steering wheel, and decrease the return gain in order to reduce a strange feel caused by the return control. When the return torque is less than the preset torque, the return controller 40 may determine that the driver has no intention to handle the steering wheel, and increase the return gain.

As described above, the steering return control method of the MDPS in accordance with the embodiment of the present invention may correct the target position value of the rack stroke for return control by monitoring the neutral drive state of the vehicle in real time, and return the steering wheel to the neutral position at which the vehicle can be driven in the neutral state even though the wheel alignment is distorted or an error occurs in the steering angle sensor. Thus, the steering return control method can prevent a degradation of the return control performance, and improve steering convenience for a driver.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A motor driven power steering (MDPS) apparatus for a vehicle, comprising:
    a vehicle speed sensor configured to detect a vehicle speed;
    a yaw rate sensor configured to sense a tilted state of the vehicle, and output a yaw rate value;
    a column torque sensor configured to detect a column torque applied to a steering shaft;
    a motor encoder configured to detect a rotation amount of a motor for driving a rack bar of the vehicle; and
    a return controller configured to:
        receive the vehicle speed, the yaw rate value and the column torque from the vehicle speed sensor, the yaw rate sensor and the column torque sensor, respectively,
        determine whether the vehicle is driving in a neutral state, calculate a rack position and rack speed using the rotation amount,
        set a target position for the rack bar in the neutral drive state, calculate a return torque for returning the rack bar to the target position,
        adjust a gain according to the vehicle speed and the column torque, and
        output a return torque driving value,
    wherein the return controller is configured to determine that the vehicle is driving in the neutral state when the vehicle speed exceeds a reference vehicle speed, the column torque is less than a reference column torque for each vehicle speed, the yaw rate is less than a reference yaw rate, and an accumulated neutral state retention time exceeds a neutral state determination reference time,
    wherein when it is determined that the vehicle is driving in the neutral state, the return controller is configured to set the target position to the rack position calculated from the rotation amount, configured to calculate a return amount based on a position difference between the target position and a current rack position, configured to calculate a return speed for driving the return amount according to the rack speed, and configured to calculate the return torque.

2. The apparatus of claim 1, wherein the return controller is configured to:
    calculate the rack position from the rotation amount of the motor, inputted from the motor encoder;
    calculate the rack speed from the rotation amount of the motor, inputted from the motor encoder;
    calculate the return amount based on the position difference between the target position and the rack position; and
    calculate the return speed for driving the return amount calculated by the return amount calculator according to the rack speed.

3. The apparatus of claim 1, wherein the return controller is configured to apply a vehicle speed gain and a decoupling gain to the return torque, and output the return torque driving value, wherein the vehicle speed gain is outputted as a gain of 1 when the vehicle speed is within a preset speed range, and the decoupling gain decreases from the gain of 1 as the column torque is increased.

4. The steering return control apparatus of claim 1, further comprising a storage configured to store the target position in the neutral drive state, which is set by the return controller.

5. A method for controlling a motor driven power steering (MDPS) apparatus of a vehicle, comprising:
    receiving, by a return controller, a vehicle speed, a yaw rate value and a column torque from a vehicle speed sensor, a yaw rate sensor and a column torque sensor, respectively, and determining whether the vehicle is driving in a neutral state;
    setting, by the return controller, a current rack position to a target position when it is determined that the vehicle is driving in the neutral state;
    calculating, by the return controller, a return torque for returning a rack bar of the vehicle to the target position according to the rack position and rack speed; and
    applying, by the return controller, a gain based on the vehicle speed and column torque to the calculated return torque, and outputting a return torque driving value,
    wherein the determining of whether the vehicle is driving in the neutral state comprises:
        determining, by the return controller, whether the vehicle speed exceeds a reference vehicle speed,
        determining, by the return controller, whether the column torque is less than a reference column torque for each vehicle speed, when the vehicle speed exceeds the reference vehicle speed,
        determining, by the return controller, whether the yaw rate is less than a reference yaw rate, when the column torque is less than the reference column torque for each vehicle speed,
        accumulating, by the return controller, a drive state retention time when the yaw rate is less than a reference yaw rate, and
        determining, by the return controller, that the vehicle is driven in the neutral state, when the drive state retention time exceeds a neutral state determination reference time.

6. The method of claim 5, wherein the setting of the current rack position to the target position comprises storing, by the return controller, the target position in a storage.

7. The method of claim 5, wherein the calculating of the return torque comprises calculating, by the return controller, the rack position and the rack speed from a rotation amount of a motor, inputted from a motor encoder.

8. The method of claim 5, wherein the calculating of the return torque comprises:
    calculating, by the return controller, a return amount based on a position difference between the target position and the current rack position;
    calculating, by the return controller, a return speed for driving the return amount according to the rack speed; and
    calculating, by the return controller, the return torque according to the calculated return speed.

9. The method of claim 5, wherein in the outputting of the return torque driving value, the return torque outputter applies a vehicle speed gain and a decoupling gain to the return torque, and outputs the return torque driving value, wherein the vehicle speed gain is outputted as a gain of 1 when the vehicle speed is within a preset speed range, and the decoupling gain decreases from the gain of 1 as the column torque is increased.

\* \* \* \* \*